(12) United States Patent
Hoshino et al.

(10) Patent No.: US 8,371,426 B2
(45) Date of Patent: Feb. 12, 2013

(54) POWER TRANSMISSION MECHANISM (75) Inventors: Nobuaki Hoshino, Kariya (JP); Masaki Ota, Kariya (JP); Xiaoliang Wang, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 1179 days.

(21) Appl. No.: 11/833,422

(22) Filed: Aug. 3, 2007

(65) Prior Publication Data
US 2008/0041686 A1 Feb. 21, 2008

(30) Foreign Application Priority Data
Aug. 4, 2006 (JP) .................................. 2006-213043

(51) Int. Cl.
*F16D 27/105* (2006.01)
(52) U.S. Cl. ....................................... 192/84.81; 192/75
(58) Field of Classification Search ............... 192/84.81, 192/84.961, 41 S, 75
See application file for complete search history.

(56) References Cited

U.S. PATENT DOCUMENTS

| | | | | | |
|---|---|---|---|---|---|
| 3,095,071 | A | * | 6/1963 | Mason ......................... | 192/81 R |
| 3,637,056 | A | * | 1/1972 | Baer ........................ | 192/12 BA |
| 3,685,622 | A | * | 8/1972 | Baer et al. ....................... | 192/35 |
| 3,831,723 | A | * | 8/1974 | Briar et al. ................. | 192/84.81 |
| 4,201,281 | A | * | 5/1980 | MacDonald ..................... | 192/35 |
| 4,460,076 | A | * | 7/1984 | Yamada ......................... | 192/35 |
| 4,502,578 | A | | 3/1985 | Koyama | |
| 2002/0003077 | A1 | | 1/2002 | Moroi et al. | |

FOREIGN PATENT DOCUMENTS

| | | |
|---|---|---|
| JP | 59-43230 | 3/1984 |
| JP | 60-164020 | 8/1985 |
| JP | 60-164021 A | 8/1985 |
| JP | 60-175830 | 9/1985 |
| JP | 2003-322174 A | 11/2003 |
| JP | 60-164023 | 8/2005 |
| JP | 2006-161930 A | 6/2006 |

* cited by examiner

*Primary Examiner* — David D Le
*Assistant Examiner* — Terry Chau
(74) *Attorney, Agent, or Firm* — Woodcock Washburn LLP (57) ABSTRACT

A power transmission mechanism that permits power to be transmitted from an external driving source to a rotary shaft of a rotating machine includes a first rotating body, a second rotating body, an armature, and a spring clutch. The spring clutch is wound about an outer circumference of the first rotating body and an outer circumference thereof is surrounded by the extended portion of the second rotating body. The spring clutch has a first end connected to the first rotating body, and the second end is connected to the armature. Supply of current to the electromagnetic coil causes the armature to adhere to the second rotating body. When the armature rotates, the diameter of the spring clutch is increased such that the spring clutch is pressed against the inner circumferential surface of the extended portion and the first rotating body and the second rotating body are coupled to each other.

5 Claims, 4 Drawing Sheets

Prior Art

Fig.4

POWER TRANSMISSION MECHANISM

CROSS-REFERENCE TO RELATED APPLICATION

This application is based upon and claims the benefit of priority from prior Japanese Patent Application No. 2006-213043, filed on Aug. 4, 2006, the entire contents of which is incorporated herein by reference.

FIELD OF THE INVENTION

The present invention relates to a power transmission mechanism that permits power to be transmitted from an external driving source to a rotary shaft.

BACKGROUND OF THE INVENTION

Figure 4:
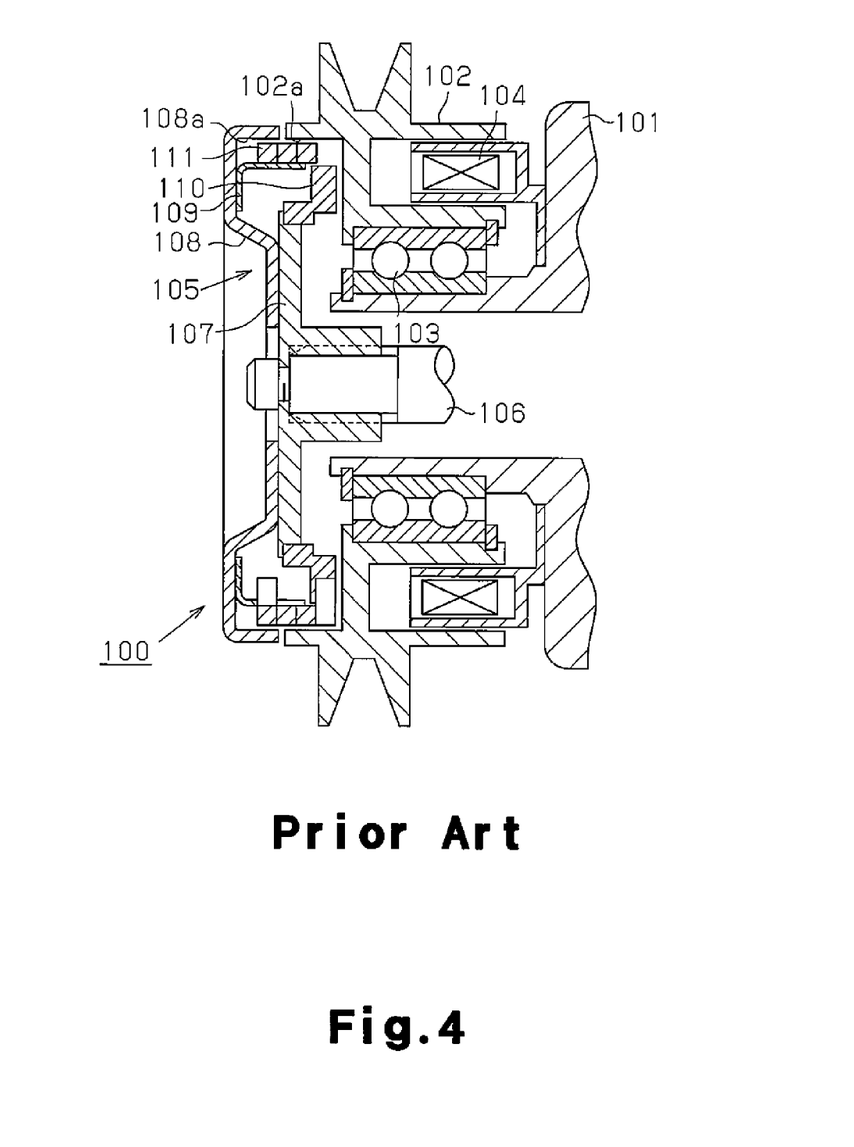
FIG. 4 is an enlarged partial cross-sectional view illustrating a power transmission mechanism according to the background art.

Some refrigerant compressors for vehicle air conditioner have a power transmission mechanism 100 as illustrated in FIG. 4 (for example, refer to Japanese Laid-Open Patent Publication No. 60-175830), which intermittently transmits power of a vehicle engine to the rotary shaft of the compressor. That is, the refrigerant compressor includes a fixed frame 101 and an input hub 102 provided outside of the fixed frame 101. The input hub 102 receives power from a vehicle engine (not shown). The input hub 102 serves as a first rotating body and is rotatably supported by the fixed frame 101 with a bearing 103. A excitation coil 104 is accommodated in the input hub 102. The input hub 102 has an inner circumferential surface 102a at its distal end.

An output hub 105 serving as a second rotating body is provided at an end of an output shaft 106 of the refrigerant compressor. The output hub 105 includes a first hub member 107 fixed to the output shaft 106, a second hub member 108 fixed to the first hub member 107, and a spring retainer drum 109 fixed to the second hub member 108. The second hub member 108 has an inner circumferential surface 108a on a surface that is opposite to its outer circumference. An armature 110 is provided on the first hub member 107. The armature 110 faces the input hub 102 with a space in between. A coil spring 111 is wound about the outer circumferential surface of the spring retainer drum 109. A first end of the coil spring 111 is connected to the output hub 105, specifically, to the spring retainer drum 109. A second end of the coil spring 111 is connected to the armature 110.

When power is transmitted from the vehicle engine to the rotary shaft 106 of the refrigerant compressor using the power transmission mechanism 100, a current is supplied to the excitation coil 104, so that the excitation coil 104 is excited. This causes the armature 110 to adhere to and be pressed against the input hub 102. Accordingly, the armature 110 and the input hub 102 rotate integrally. Also, the coil spring 111 rotates at the second end, which is connected to the armature 110. In this state, since the coil spring 111 receives a rotational force in the unwinding direction, the coil spring 111 is radially outwardly expanded with respect to its rotation axis, or the axis of the rotary shaft of the compressor. That is, coil diameter of the coil spring 111 is increased. The expanded coil spring 111 presses itself against the inner circumferential surface 102a of the input hub 102 and the inner circumferential surface 108a of the output hub 105 (that is, the second hub member 108). Thus, the power from the vehicle engine is transmitted from the input hub 102 through the coil spring 111 to the second hub member 108, and then transmitted through the output hub 105 to the output shaft 106.

In the power transmission mechanism 100, the coil spring 111 with an increased diameter is pressed against the inner circumferential surface 102a of the input hub 102 and the inner circumferential surface 108a of the second hub member 108, so that power is transmitted. To transmit power by means of such pressing of the coil spring 111, a desired length of the coil spring 111 needs to be pressed against the two inner circumferential surfaces 102a, 108a. That is, the inner circumferential surfaces 102a, 108a need to have a certain length in the axial direction, which increased the size of the power transmission mechanism 100. Pressing the coil spring 111 with an increased diameter against the inner circumferential surfaces 102a, 108a wears the coil spring 111 and both circumferential surfaces 102a, 108a. This reduces the reliability of the power transmission mechanism 100.

SUMMARY OF THE INVENTION

Accordingly, it is an objective of the present invention to provide a power transmission mechanism that has a reduced size compared to a type of a power transmission mechanism in which a first rotating body and a second rotating body each need to have a contact surface for a spring clutch, and prevents the reliability from being reduced.

According to a first aspect of the invention, a power transmission mechanism that permits power to be transmitted from an external driving source to a rotary shaft of a rotating machine is provided. The power transmission mechanism includes a first rotating body, a second rotating body, an armature, and a spring clutch. The first rotating body rotates integrally with the rotary shaft of the rotating machine. The second rotating body is rotatably supported on a housing of the rotating machine, and is coaxially arranged with the first rotating body. The second rotating body receives power from the external driving source, accommodates an electromagnetic coil, and has a cylindrical extended portion. The armature is arranged to face the second rotating body. The spring clutch is wound about an outer circumference of the first rotating body. An outer circumference of the spring clutch is surrounded by the extended portion of the second rotating body. The spring clutch has a first end and a second end. The first end is connected to the first rotating body, and the second end is connected to the armature. Supply of current to the electromagnetic coil causes the armature to adhere to the second rotating body. When the armature rotates, the diameter of the spring clutch is increased such that the spring clutch is pressed against the inner circumferential surface of the extended portion and the first rotating body and the second rotating body are coupled to each other.

According to a second aspect of the invention, a rotating machine having a rotary shaft and a power transmission mechanism that permits power to be transmitted from an external driving source to the rotary shaft is provided. The power transmission mechanism includes a first rotating body, a second rotating body, an armature, and a spring clutch. The first rotating body rotates integrally with the rotary shaft of the rotating machine. The second rotating body is rotatably supported on a housing of the rotating machine, and is coaxially arranged with the first rotating body. The second rotating body receives power from the external driving source, accommodates an electromagnetic coil, and has a cylindrical extended portion. The armature is arranged to face the second rotating body. The spring clutch is wound about an outer circumference of the first rotating body. An outer circumference of the spring clutch is surrounded by the extended portion of the second rotating body. The spring clutch has a first end and a second end. The first end is connected to the first rotating body, and the second end is connected to the armature. Supply of current to the electromagnetic coil causes the armature to adhere to the second rotating body. When the armature rotates, the diameter of the spring clutch is increased such that the spring clutch is pressed against the inner circumferential surface of the extended portion and the first rotating body and the second rotating body are coupled to each other.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

A power transmission mechanism according to one embodiment of the present invention will now be described with reference to FIGS. 1 to 3B. In this embodiment, the power transmission mechanism is an electromagnetic spring clutch used in a refrigerant compressor of a vehicle air conditioner. In the following, the frontward and rearward directions of a refrigerant compressor 10 refer to directions indicated by arrow Y in FIG. 1.

Figure 1:
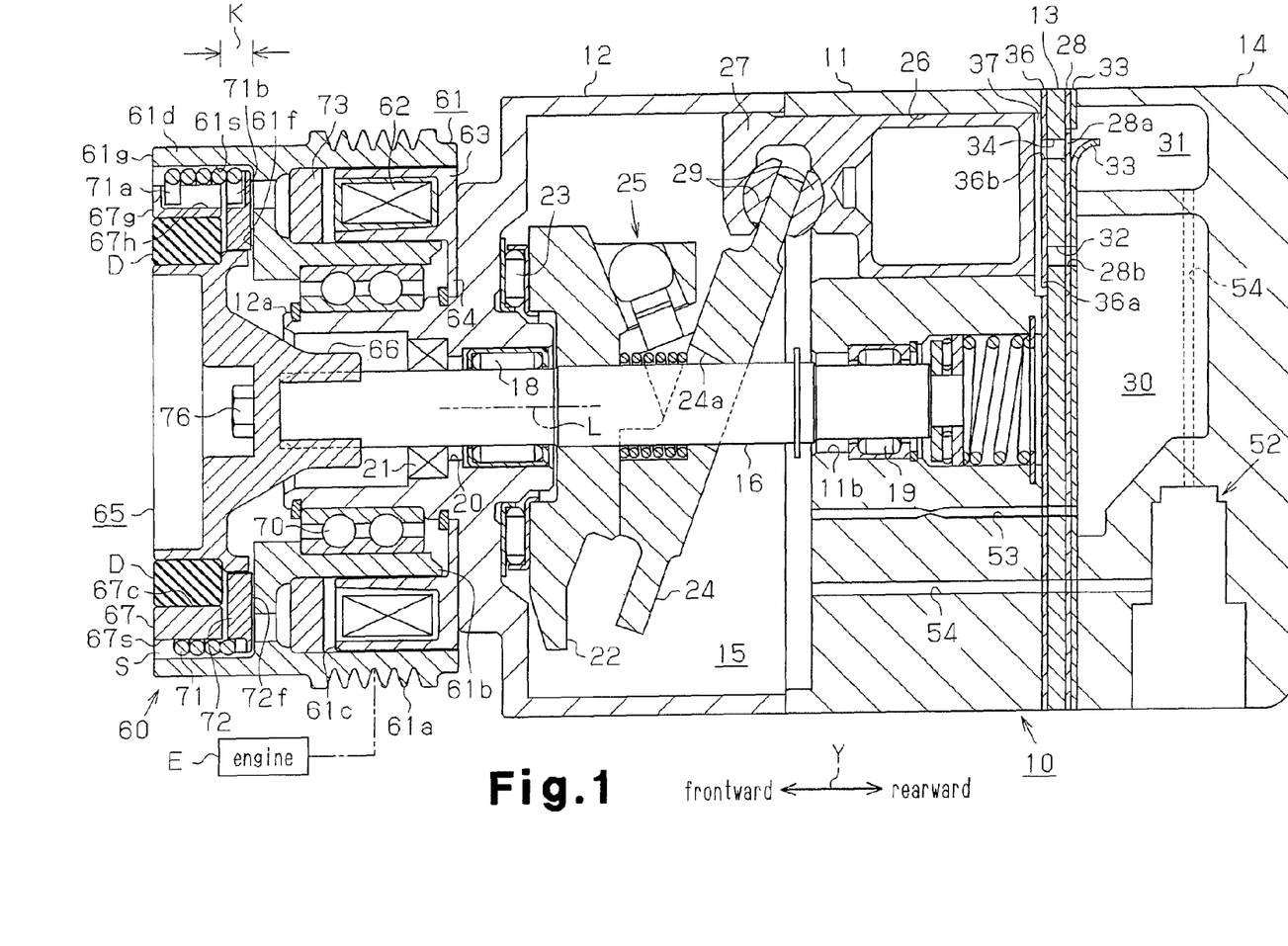
FIG. 1 is a longitudinal cross-sectional view illustrating a refrigerant compressor according to one embodiment of the present invention.

As shown in FIG. 1, a housing of the refrigerant compressor 10, or a rotating machine, includes a cylinder block 11, a front housing member 12, and a rear housing member 14. The front housing member 12 is secured to one end, or a front end, of the cylinder block 11. The rear housing member 14 is secured to the other end, or the rear end, of the cylinder block 11. Between the cylinder block 11 and the rear housing member 14, a suction valve forming plate 36, a valve plate 13, a discharge valve forming plate 28, and a retainer 33 are provided in this order from the cylinder block 11 to the rear housing member 14.

A control pressure chamber 15 is defined between the cylinder block 11 and the front housing member 12. A rotary shaft 16 is rotatably supported by the cylinder block 11 and the front housing member 12 to extend through the control pressure chamber 15. A support cylinder 12a is formed at the front end the front housing member 12 to surround a front portion of the rotary shaft 16. One end, or the front end, of the rotary shaft 16 is connected to and driven by an external drive source, which is a vehicle engine E, through a power transmission mechanism, which is an electromagnetic spring clutch 60.

The front portion of the rotary shaft 16 is rotatably supported by the front housing 12 with a radial bearing 18. In the front housing member 12, a shaft surrounding chamber 20 is defined between a circumferential surface of a front portion of the rotary shaft 16 and an inner circumferential surface of the front housing member 12 that faces the front circumferential surface of the rotary shaft 16. A shaft sealing member 21 is provided in the shaft surrounding chamber 20 to seal the space between the circumferential surface of the rotary shaft 16 and the circumferential surface of the shaft surrounding chamber 20. A rear portion of the rotary shaft 16 extends through a shaft hole 11b formed in the cylinder block 11, and is rotatably supported by the shaft hole 11b with a radial bearing 19.

In the control pressure chamber 15, a rotary support 22 is fixed to the rotary shaft 16 to rotate integrally with the rotary shaft 16. A thrust bearing 23 is arranged between the rotary support 22 and an inner wall surface of the front housing member 12. A swash plate 24 is accommodated in the control pressure chamber 15. A shaft receiving hole 24a is formed in a center of the swash plate 24. The rotary shaft 16 is inserted through the shaft receiving hole 24a. A hinge mechanism 25 is located between the rotary support 22 and the swash plate 24. Since the swash plate 24 is coupled to the rotary support 22 by means of the hinge mechanism 25, and supported by the rotary shaft 16 at the shaft receiving hole 24a, the swash plate 24 synchronously rotates with the rotary shaft 16 and the rotary support 22. While sliding along an center axis L of the rotary shaft 16, the swash plate 24 changes its inclination angle relative to the rotary shaft 16.

Cylinder bores 26 (only one is shown in FIG. 1) are formed through the cylinder block 11 along the front-and-rear direction. The cylinder bores 26 are arranged about the rotary shaft 16 at equal angular intervals. A single-headed piston 27 is housed in each cylinder bore 26 to reciprocate along the front-and-rear direction. The front and rear openings of each cylinder bore 26 are closed by the valve plate 13 and the corresponding pistons 27, so that a compression chamber 37 is defined in each cylinder bore 26. The volume of the compression chamber 37 is changed as the corresponding piston 27 moves frontward and rearward. Each piston 27 is coupled to a peripheral portion of the swash plate 24 by a pair of shoes 29.

A suction chamber 30 and a discharge chamber 31, which face the valve plate 13, are defined in the rear housing member 14. Specifically, the suction chamber 30 is located in a center portion of the rear housing member 14, and the discharge chamber 31 surrounds the suction chamber 30. The valve plate 13 has suction ports 32 and discharge ports 34 at positions that correspond to the respective cylinder bores 26. The suction ports 32 are located radially inward of the discharge ports 34.

The suction valve forming plate 36 has suction valve flaps 36a at positions that correspond to the respective suction ports 32. Each suction valve flap 36a opens and closes the corresponding suction port 32. The suction valve forming plate 36 has discharge holes 36b at positions that correspond to the respective discharge ports 34. The discharge valve forming plate 28 has discharge valve flaps 28a at positions that correspond to the respective discharge ports 34. Each discharge valve flap 28a opens and closes the corresponding discharge port 34. The discharge valve forming plate 28 has suction holes 28b at positions that correspond to the respective suction ports 32. The retainer 33 limits the opened positions of the discharge valve flaps 28a. An electromagnetic displacement control valve 52 is installed in the rear housing member 14.

As each piston 27 moves, a refrigerant gas is drawn into the compression chamber 37 through the suction hole 28b and the suction port 32, while flexing the suction valve flap 36a. The drawn refrigerant gas is compressed in the compression chamber 37 as the pistons 27 moves. The compressed gas is discharged from the compression chamber 37 to the discharge chamber 31 through the discharge hole 36b and the discharge port 34, while flexing the discharge valve flap 28a. Then, the compressed refrigerant gas is conducted out to an external refrigerant circuit (not shown). The refrigerant gas returns from the external refrigerant circuit and is drawn into the suction chamber 30. The refrigerant compressor 10 of the present embodiment and the external refrigerant circuit form a refrigerant circulation circuit. The cylinder block 11 (the cylinder bores 26), the rotary shaft 16, the rotary support 22, the swash plate 24, hinge mechanism 25, the pistons 27, and the shoes 29 form a compression mechanism of the refrigerant compressor 10, which mechanism is operated based on rotation of the rotary shaft 16.

The refrigerant compressor 10 has a supply passage 54, which connects the discharge chamber 31, or a discharge pressure zone, with the control pressure chamber 15, thereby supplying the refrigerant gas in the discharge chamber 31 as control gas to the control pressure chamber 15. The displacement control valve 52 is provided in the supply passage 54. The refrigerant compressor 10 has a bleed passage 53, which connects the control pressure chamber 15 with the suction chamber 30, or a suction pressure zone, thereby releasing the refrigerant gas in the control pressure chamber 15 as control gas to the suction chamber 30.

Refrigerant gas discharged to the discharge chamber 31 is supplied to the control pressure chamber 15 through the supply passage 54. The displacement control valve 52 adjusts the amount of refrigerant gas that is supplied to the control pressure chamber 15 through the supply passage 54. Refrigerant gas in the control pressure chamber 15 is released to the suction chamber 30 through the bleed passage 53. Accordingly, the balance between the amount of refrigerant gas supplied to the control pressure chamber 15 through the supply passage 54 and the amount of refrigerant gas released from the control pressure chamber 15 through the bleed passage 53 is controlled, so that the pressure in the control pressure chamber 15 is determined. When the pressure in the control pressure chamber 15 is changed, the difference between the pressure in the control pressure chamber 15 and the pressure in the cylinder bores 26 is changed. Accordingly, the inclination angle of the swash plate 24 is changed. As a result, the stroke of the pistons 27, that is, the displacement of the refrigerant compressor 10, is adjusted.

The electromagnetic spring clutch 60 will now be described. As shown in FIGS. 1 to 3B, a second rotating body, which is a rotor 61, is rotatably supported radially outside of the support cylinder 12a of the front housing member 12 with a radial bearing 70. The rotor 61 is a cylindrical body made of a magnetic material, and includes a belt receiving portion 61a and a cylindrical support portion 61b located inside of the belt receiving portion 61a. A belt (not shown) is hooked to the output shaft of the engine E and the belt receiving portion 61a. The rotor 61 is rotatably supported at the support portion 61b by the front housing 12 with the radial bearing 70.

Figure 2A:
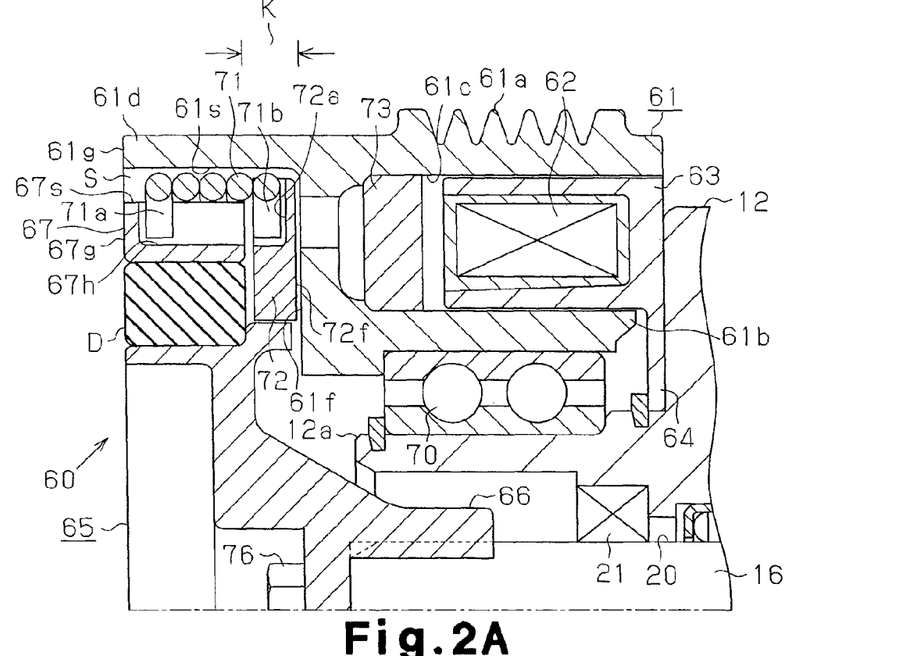
FIG. 2A is an enlarged cross-sectional view illustrating a half of the electromagnetic spring clutch shown in FIG. 1.

An annular accommodation recess 61c is defined between the inner circumferential surface of the belt receiving portion 61a and an outer circumferential surface of the support portion 61b. An accommodation cylindrical body 63 made of a magnetic material is accommodated in the accommodation recess 61c. The accommodation cylindrical body 63 accommodates an electromagnetic coil 62. The supply of current to electromagnetic coil 62 can be switched between a forward direction and a reverse direction. The accommodation cylindrical body 63, which accommodates the electromagnetic coil 62, is supported by an annular support portion 64 supported on the outer circumference of the support cylinder 12a of the front housing member 12.

In a state where the support portion 64 supports the accommodation cylindrical body 63, narrow clearances exist between the circumferential surfaces of the accommodation recess 61c (the inner circumferential surface of the belt receiving portion 61a and the outer circumferential surface of the support portion 61b) and the circumferential surfaces of the accommodation cylindrical body 63 that face the circumferential surfaces of the accommodation recess 61c. Thus, the accommodation cylindrical body 63, that is, the electromagnetic coil 62, is loosely accommodated in the rotor 61 (the accommodation recess 61c), and does not rotate integrally with the rotor 61.

A permanent magnet 73 is fitted in the rotor 61. When a current in a forward direction is supplied to the electromagnetic coil 62, a flow of magnetic flux in a forward direction is generated at the permanent magnet 73. When a current in a reverse direction is supplied to the electromagnetic coil 62, a flow of magnetic flux in a reverse direction is generated at the permanent magnet 73. The rotor 61 has an extended portion 61d at an outer circumference. The extended portion 61d projects from the belt receiving portion 61a in a direction away from the front housing member 12. That is, the extended portion 61d projects frontward. The extended portion 61d is cylindrical and extends in an axial direction of the rotor 61, that is, in an axial direction of the rotary shaft 16.

A first rotating body, which is a hub 65, is fixed to the front end of the rotary shaft 16. The hub 65 is arranged to be coaxial with and face the rotor 61. The hub 65 includes a cylindrical portion 66 and a hub portion 67, which is formed integrally with the cylindrical portion 66. The cylindrical portion 66 is attached to the outer circumference of the rotary shaft 16, and the hub portion 67 extends from the front end of the cylindrical portion 66 in a direction perpendicular to the axial direction of the cylindrical portion 66. The front portion of the rotary shaft 16 is inserted in the cylindrical portion 66. The inner circumferential surface of the cylindrical portion 66 and the circumferential surface of the front portion of the rotary shaft 16 are engaged with each other by means of splines. A bolt 76 extends through the hub 65 and is threaded to the front end of the rotary shaft 16. Thus, the hub 65 rotates integrally with the rotary shaft 16. Also, the spline engagement allows rotational force of the hub 65 to be transmitted to the rotary shaft 16. The hub portion 67 has a damper D, which is integrated with the hub portion 67 and is formed by an annular elastic body. The damper D absorbs the shock generated when the rotor 61 and the hub 65 are engaged with each other.

The hub 65 is fixed to the rotary shaft 16 so as to be accommodated in the rotor 61, specifically in the extended portion 61d. Therefore, the extended portion 61d extends from the rotor 61 toward the hub 65 along the axial direction of the rotary shaft 16. A front end face 67g of the hub 65 (the hub portion 67) in its axial direction (the axial direction of the rotary shaft 16) is flush with a front end face 61g of the extended portion 61d. That is, the end face 61g of the extended portion 61d does not project further frontward than the front end face 67g of the hub portion 67. A space K is defined between a rear end face of the hub portion 67 and the front end face of the rotor 61.

An outer circumferential surface 67s of the hub portion 67 and an inner circumferential surface 61s of the extended portion 61d are arranged to face each other at a certain distance, so that an annular accommodation space S is defined between the circumferential surfaces 67s, 61s. A spring clutch 71 is accommodated in the accommodation space S. The spring clutch 71 is wound about the outer circumference of the hub portion 67. The spring clutch 71 is a coil spring that is wound and tightened in the rotation direction of the rotary shaft 16.

Figure 3A:
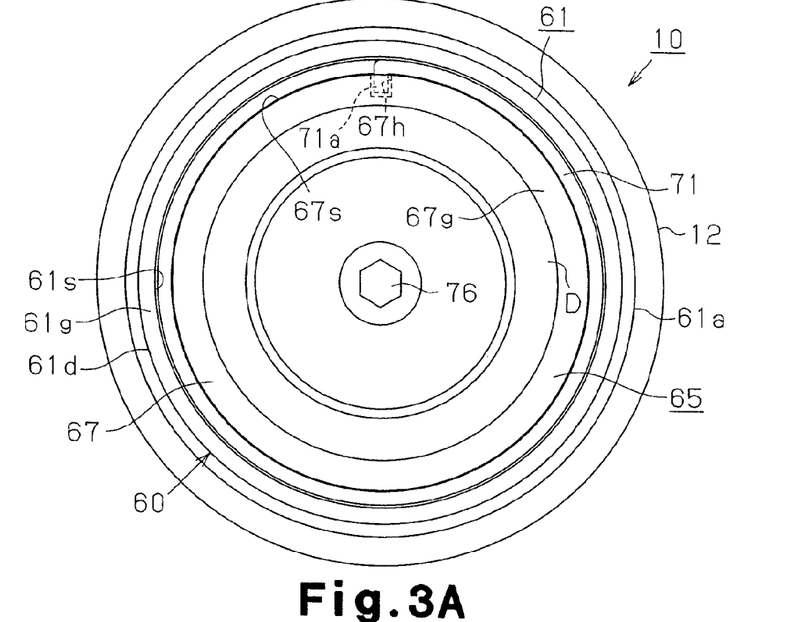
FIG. 3A is a front view illustrating the electromagnetic spring clutch shown in FIG. 1.

The outer circumferential surface 67s of the hub portion 67 defines a connection recess 67h, which extends in the radial direction of the hub 65 and in the radial direction of the hub portion 67. A first end 71a of the spring clutch 71 is connected to the connection recess 67h. That is, the first end 71a of the spring clutch 71 is coupled to the hub portion 67. As shown in FIG. 3A, the first end 71a of the spring clutch 71 is bent toward the center of the spring clutch 71 so as to be substantially perpendicular to the direction along which the spring clutch 71 extends.

Figure 3B:
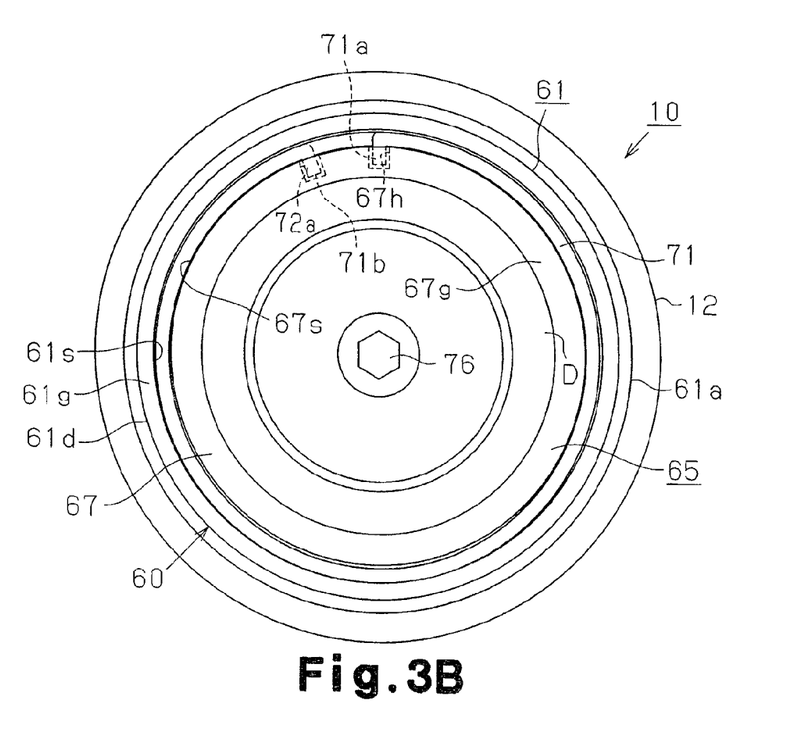
FIG. 3B is a front view illustrating the electromagnetic spring clutch in the engaged state.

On the other hand, as shown in FIG. 2A and FIG. 3B, a second end 71b of the spring clutch 71 is coupled to an annular armature 72, which is located in the space K and made of a magnetic material. The second end 71b of the spring clutch 71 is bent toward the center of the spring clutch 71 so as to be substantially perpendicular to the direction along which the spring clutch 71 extends. The circumferential surface of the armature 72 defines an connection recess 72a. The second end 71b of the spring clutch 71 is connected to the connection recess 72a. Thus, the armature 72 is coupled to the spring clutch 71, so that the armature 72 is supported by the hub 65 (the hub portion 67) through the spring clutch 71.

In a state where the spring clutch 71 is wound about the outer circumference of the hub portion 67 as shown in FIG. 2A, the hub portion 67 is encompassed by the spring clutch 71, and the outer circumferential surface of the spring clutch 71 is at a position facing the inner circumferential surface 61s of the extended portion 61d. In a state where the armature 72 is supported by the spring clutch 71, the armature 72 is located at a position facing the front end face of the rotor 61. The armature 72 has a friction surface 72f that faces the rotor 61, and the rotor 61 has a friction surface 61f that faces the friction surface 72f of the armature 72. A certain clearance exists between the friction surface 72f of the armature 72 and the friction surface 61f of the rotor 61.

Figure 2B:
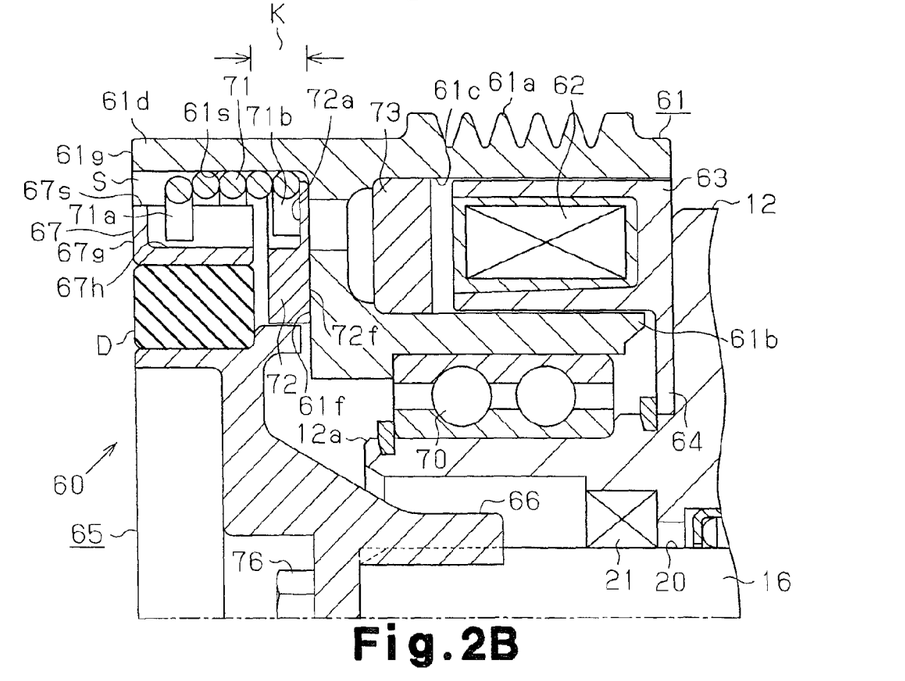
FIG. 2B is an enlarged cross-sectional view illustrating a half of the electromagnetic spring clutch in an engaged state.

In a state where the armature 72 is not attracted to the rotor 61, the spring clutch 71 has a diameter that is greater than the outer diameter of the outer circumferential surface 67s and is less than the inner diameter of the inner circumferential surface 61s of the extended portion 61d, and the spring clutch 71 is separate from both circumferential surfaces 61s, 67s. On the other hand, as shown in FIG. 2B, in a state where the armature 72 adheres to the rotor 61 and rotates with the armature 72, the spring clutch 71 receives the rotational force and expands radially outwardly with respect to its rotation axis, or an axis of the rotary shaft 16 of the compressor 10, so that the outer circumferential surface of the spring clutch 71 is pressed against the inner circumferential surface 61s of the extended portion 61d.

The operation of the electromagnetic spring clutch 60 will now be described. In a state illustrated in FIGS. 2A and 3A, when the electromagnetic coil 62 is excited by a current of the forward direction, the attraction force based on the electromagnetic force acts on the armature 72. The armature 72 is then moved toward the rotor 61 along the axial direction of the rotary shaft 16. Consequently, as shown in FIG. 2B, the friction surface 72f of the armature 72 is attracted to the friction surface 61f of the rotor 61, so that the friction surface 72f adheres to the friction surface 61f. This couples the rotor 61 with the armature 72, so that the armature 72 rotates in the rotation direction of the rotor 61.

The second end 71b of the spring clutch 71 is coupled to the armature 72. Therefore, with reference to FIG. 3B, as the armature 72 rotates, the second end 71b of the spring clutch 71 is pushed in the rotation direction by the armature 72, the spring clutch 71 is twisted in the unwinding direction. Then, the diameter of the spring clutch 71 is increased as shown in FIG. 2B, so that the outer circumferential surface of the spring clutch 71 is pressed against the inner circumferential surface 61s of the extended portion 61d. As a result, the rotor 61 is coupled to the hub 65 by means of the spring clutch 71. The rotor 61 and the hub 65 are firmly coupled to each other by the attraction force based on the electromagnetic force of the electromagnetic coil 62 and the pressing of the spring clutch 71. The power transmitted from the engine E to the rotor 61 is transmitted from the extended portion 61d of the rotor 61 to the spring clutch 71 located inside of the extended portion 61d, and then transmitted to the hub portion 67 located inside of the spring clutch 71.

In a state where the rotor 61 is coupled to the armature 72, magnetic flux flowing in the forward direction from the permanent magnet 73 is generated between the rotor 61 and the armature 72. The magnetic flux causes the armature 72 to adhere to the rotor 61, and the frictional force between the friction surface 61f and the friction surface 72f maintains the adhering state between the rotor 61 and the armature 72. Then, since the adhering state is maintained, the state in which the spring clutch 71 has an increased diameter, that is, the state in which the outer circumferential surface of the spring clutch 71 is pressed against the inner circumferential surface 61s of the extended portion 61d is maintained. After the current in the forward direction to the electromagnetic coil 62 is stopped, the attraction by the permanent magnet 73 and the pressing contact of the spring clutch 71 on the extended portion 61d still maintain the engaged state of the electromagnetic spring clutch 60, so that the power can be transmitted from the engine E to the rotary shaft 16 by means of the electromagnetic spring clutch 60.

On the other hand, when the electromagnetic coil 62 is excited by a current in the reverse direction, magnetic flux the direction of which is opposite to the case of the excitation by the forward current is generated. The magnetic flux in the forward direction is cancelled, so that the armature 72 is moved away from the friction surface 61f of the rotor 61 along the axial direction of the rotary shaft 16 by restoring force of the spring clutch 71. At this time, the spring clutch 71 is wound so that its diameter is reduced. As a result, the spring clutch 71 is no longer pressed against the inner circumferential surface 61s of the extended portion 61d, so that the hub 65 and the rotor 61 are disengaged. Thus, the power of the engine E cannot be transmitted to the rotary shaft 16.

The above described embodiment has the following advantages.

The spring clutch 71 is wound about the hub 65 (the hub portion 67), and the extended portion 61d of the rotor 61 surrounds the outer circumference of the spring clutch 71. When the armature 72 adheres to the rotor 61, the spring clutch 71 increases its diameter and presses itself to the extended portion 61d (inner circumferential surface 61s) of the rotor 61, so that the rotor 61 and the hub 65 are coupled to each other to transmit power. Thus, unlike the background art in which the coil spring 111 having an increased diameter is pressed against two inner circumferential surfaces 102a, 108a, the hub 65 of the electromagnetic spring clutch 60 according to the present embodiment does not need to have a contact surface that is pressed against the spring clutch 71.

Accordingly, the length of the electromagnetic spring clutch 60 along the axial direction of the rotary shaft 16 can be reduced, which reduces the size of the electromagnetic spring clutch 60.

The spring clutch 71 is pressed against the rotor 61 only at the extended portion 61d. Thus, unlike the background art in which the coil spring 111 with an increased diameter is pressed against the two inner circumferential surfaces 102a, 108a, the electromagnetic spring clutch 60 according to the present embodiment has only one section that wears due to contact with the spring clutch 71. Therefore, the reliability of the electromagnetic spring clutch 60 is prevented from being reduced.

The front end face 61g of the extended portion 61d of the rotor 61 is not forwardly beyond the front end face 67g of the hub 65. Specifically, the front end face 61g is flush with the front end face 67g. Thus, although extending from the rotor 61, the extended portion 61d contributes to the reduction of the size of the electromagnetic spring clutch 60.

The outer circumferential surface of the spring clutch 71 is pressed against only the inner circumferential surface 61s of the extended portion 61d to transmit power, and almost the entire outer circumferential surface of the spring clutch 71 is pressed against the inner circumferential surface 61s of the extended portion 61d. Thus, if the number of windings of the spring clutch 71 of the present embodiment is set to the same as the number of windings of the coil spring 111 of the background art, the number of windings (area) of the spring clutch 71 that is pressed against the inner circumferential surface 61s of the extended portion 61d is greater than the area of the coil spring 111 of the background art that is pressed against the two inner circumferential surfaces 102a, 108a. Therefore, compared to the background art, the amount of power transmitted from the rotor 61 to the spring clutch 71 is increased.

The hub 65 is accommodated inside of the extended portion 61d of the rotor 61. Thus, unlike the background art, in which, in order to press the coil spring 111 with an increased diameter against the inner circumferential surface 108a of the second hub member 108, the inner circumferential surface 108a needs to be located radially outside of the coil spring 111 and linearly aligned with the inner circumferential surface 102a, the hub 65 of the electromagnetic spring clutch 60 of the present embodiment does not need to be located radially outside of the spring clutch 71 nor formed to be continuous with the extended portion 61d. Therefore, the axial size and the diametrical size of the electromagnetic spring clutch 60 are both reduced.

The diameter of the spring clutch 71 is increased so that the spring clutch 71 is pressed against the extended portion 61d the rotor 61, which couples the rotor 61 and the hub 65 to each other. Therefore, compared to the case in which the rotor 61 and the hub 65 are coupled to each other by winding the spring clutch 71 with respect to the hub 65, the diametrical length of the hub portion 67 is increased. The diametrical size of the damper D attached to the hub portion 67 can be increased. This improves the impact absorbing performance when the rotor 61 is coupled to the hub 65.

The preferred embodiment may be modified as follows.

The first end 71a and the second end 71b of the spring clutch 71 do not need to be bent, and the first end 71a and the second end 71b may contact a pin provided on the outer circumferential surface 67s of the hub portion 67 and a pin provided on the outer circumferential surface of the armature 72, respectively. In this case, when the armature 72 adheres to the rotor 61 and the armature 72 rotates, the pin presses the second end 71b of the spring clutch 71, thereby expanding the spring clutch 71.

In the rotor 61, the front end face 61g of the extended portion 61d may be located rearward of the front end face 67g of the hub 65 (the hub portion 67) as long as the front end face 61g of the extended portion 61d is not located forward of the front end face 67g of the hub 65, and the extended portion 61d surrounds the outer circumference of the spring clutch 71.

The permanent magnet 73 in the rotor 61 may be omitted.

A current in the reverse direction may be applied to the electromagnetic coil 62 by reversing the direction of the magnetic flux of the permanent magnet 73, such that the armature 72 is attracted to the rotor 61 to engage the electromagnetic spring clutch 60. In this case, a current in the forward direction is applied to the coil 62 to separate the armature 72 from the rotor 61, so that the electromagnetic spring clutch 60 is disengaged.

In the illustrated embodiment, the present invention is applied to a compressor that has the single headed pistons 27. However, the present invention may be applied to a compressor that has double-headed pistons. In this type of compressor, cylinder bores are formed on either side of a control pressure chamber and each piston compresses gas in the corresponding pair of the cylinder bores.

In the illustrated embodiments, the swash plate 24 rotates integrally with the rotary shaft 16. However, the present invention may be applied to a compressor in which relative rotation between the swash plate 24 and the rotary shaft 16 is permitted. For example, the present invention may be applied to a wobble type compressor.

The compressor 10 may be a fixed displacement type compressor, in which the stroke of the pistons 27 is not variable.

Other than the piston type refrigerant compressor 10, in which the pistons 27 reciprocate, the present invention may be any type of rotating machine to which power is transmitted from an external drive source by means of the electromagnetic spring clutch 60.

The second rotating body does not need to be the rotor 61, but may be a sprocket or a gear.

The present examples and embodiments are to be considered as illustrative and not restrictive and the invention is not to be limited to the details given herein, but may be modified within the scope and equivalence of the appended claims.

What is claimed:

1. A power transmission mechanism that permits power to be transmitted from an external driving source to a rotary shaft of a rotating machine, comprising:
    a first rotating body that rotates integrally with the rotary shaft of the rotating machine;
    a second rotating body rotatably supported on a housing of the rotating machine, the second rotating body being coaxially arranged with the first rotating body, wherein the second rotating body receives power from the external driving source, accommodates an electromagnetic coil, and has a cylindrical extended portion;
    an armature that is arranged to face the second rotating body; and
    a spring clutch wound about an outer circumference of the first rotating body, an entire outer circumference of the spring clutch being surrounded by the extended portion of the second rotating body, wherein the spring clutch has a first end and a second end, the first end being connected to the first rotating body, and the second end being connected to the armature,
    wherein supply of current to the electromagnetic coil causes the armature to adhere to the second rotating body, wherein, when the armature rotates, the diameter of the spring clutch is increased such that the spring clutch is pressed against the inner circumferential surface of the extended portion and the first rotating body and the second rotating body are coupled to each other.

2. The power transmission mechanism according to claim 1, wherein the extended portion extends from the second rotating body toward the first rotating body along an axial direction of the rotary shaft, and wherein an end face of the extended portion on the side corresponding to first rotating body does not protrude further than the first rotating body.

3. A rotating machine comprising:
a rotary shaft; and
a power transmission mechanism that permits power to be transmitted from an external driving source to the rotary shaft, wherein the power transmission mechanism includes:
a first rotating body that rotates integrally with the rotary shaft of the rotating machine;
a second rotating body rotatably supported on a housing of the rotating machine, the second rotating body being coaxially arranged with the first rotating body, wherein the second rotating body receives power from the external driving source, accommodates an electromagnetic coil, and has a cylindrical extended portion;
an armature that is arranged to face the second rotating body; and
a spring clutch wound about an outer circumference of the first rotating body, an entire outer circumference of the spring clutch being surrounded by the extended portion of the second rotating body, wherein the spring clutch has a first end and a second end, the first end being connected to the first rotating body, and the second end being connected to the armature,
wherein supply of current to the electromagnetic coil causes the armature to adhere to the second rotating body, wherein, when the armature rotates, the diameter of the spring clutch is increased such that the spring clutch is pressed against the inner circumferential surface of the extended portion and the first rotating body and the second rotating body are coupled to each other.

4. The rotating machine according to claim 3, further comprising a compression mechanism that is driven based on rotation of the rotary shaft.

5. The rotating machine according to claim 3, the rotating machine being a refrigerant compressor.

* * * * *